United States Patent [19]
Coursault et al.

[11] 3,773,382
[45] Nov. 20, 1973

[54] SEATS, PARTICULARLY FOR MOTOR VEHICLES

[75] Inventors: Roger M. Coursault; Francois Fourrey, both of Billancourt, France

[73] Assignees: Regie Nationale Des Usines Renault, Billancourt; Automobiles Peugeot, Paris, France

[22] Filed: June 28, 1971

[21] Appl. No.: 157,463

[30] Foreign Application Priority Data
July 10, 1970 France .............................. 7025840

[52] U.S. Cl. ................. 297/284, 297/384, 297/423, 297/427, 297/355
[51] Int. Cl. ............................................. A47c 7/14
[58] Field of Search .................... 297/284, 390, 384, 297/216, 427, 355, 375, 423

[56] References Cited
UNITED STATES PATENTS

| | | | |
|---|---|---|---|
| 3,623,768 | 11/1971 | Capener | 297/390 |
| 3,173,722 | 3/1965 | Carbonetti | 297/390 X |
| 1,512,834 | 10/1924 | Eddy | 297/375 |
| 2,619,157 | 11/1952 | Guyton | 297/284 |
| 3,640,571 | 2/1972 | Keropian | 297/384 |
| 1,597,847 | 8/1926 | Walton | 297/375 |
| 2,252,097 | 8/1941 | Rockenfield | 297/375 |
| 1,196,371 | 8/1916 | Lattig | 297/375 |
| 3,409,326 | 11/1968 | Kerner | 297/384 |
| 2,873,122 | 2/1959 | Peras | 297/384 X |
| 3,278,230 | 10/1966 | Boyce | 297/384 |

Primary Examiner—Francis K. Zugel
Attorney—Stevens, Davis, Miller & Mosher

[57] ABSTRACT

Seat comprising a seating squab and a back-rest cushion having lateral edges and parts adjustable against the force exerted by an elastic member, round axes parallel to the edges of the seating portion and of the back portion, characterized in that each controllable part of the seating portion and of the back portion is firmly fixed to a sliding framework such as 11 for the lateral edges 4 inserted between a fixed locking plate 15 and a movable locking plate 16, this latter being controlled by a control device.

2 Claims, 5 Drawing Figures

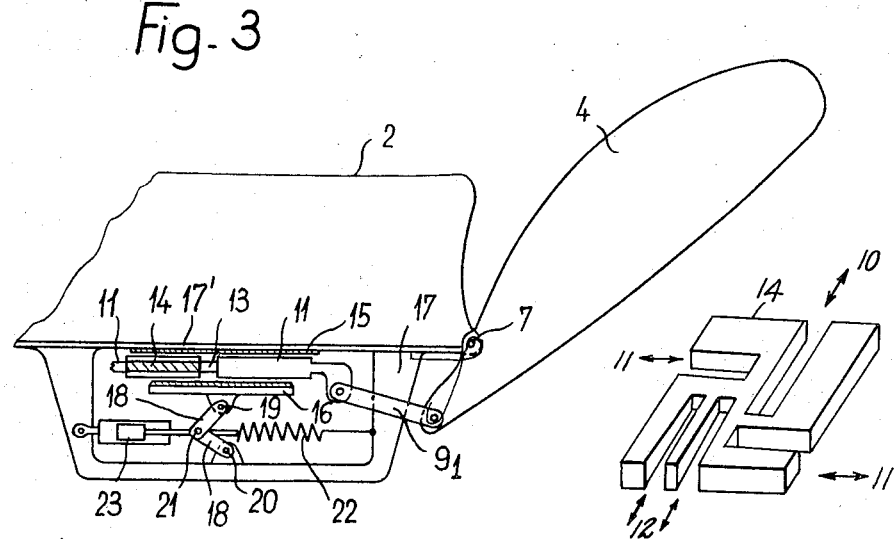
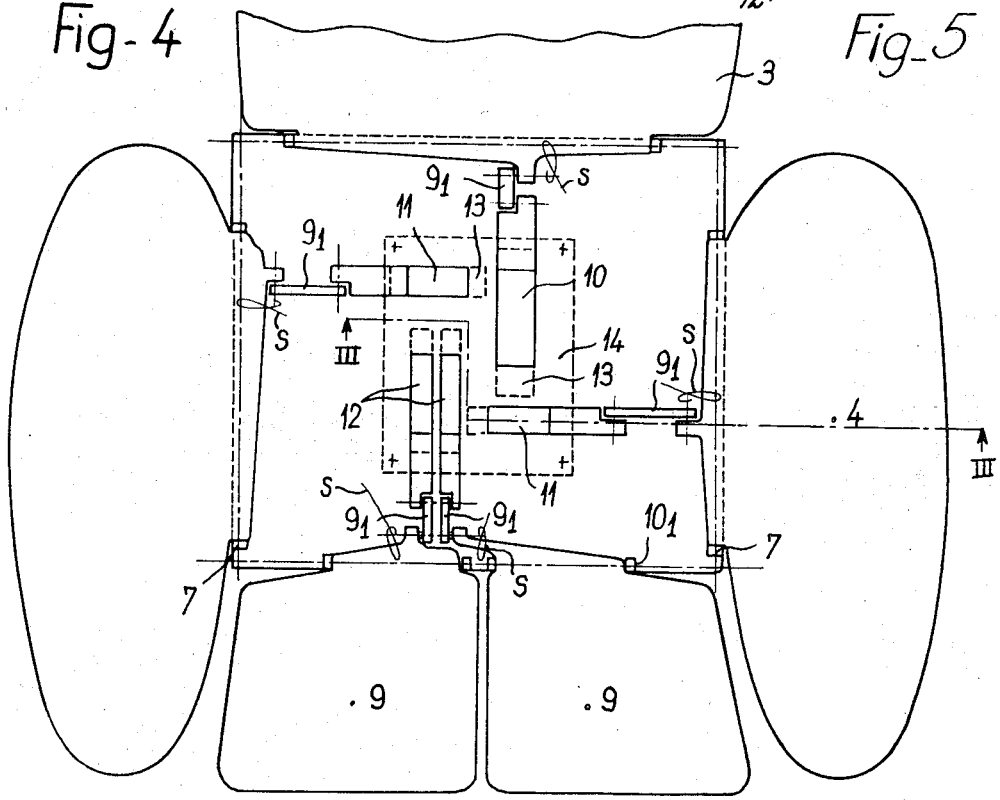

SEATS, PARTICULARLY FOR MOTOR VEHICLES

This invention relates to seats for vehicles. The invention more particularly relates to a seat whose seating portion and back cushions have side edges raised over at least a part of their length.

Known seats of this kind, generally termed "Bucket seats," have a frame covered with padding the raised projecting edges of which support the user laterally.

In spite of the constructional advantages of "bucket seats" they often present the disadvantage of remaining rigid because the different parts of the seat are firmly connected to a given framework. To overcome this drawback bucket seats have already been used where the slope of the back of the seat can be varied and the seating portion and back are adapted to the width and height of the passenger. Such a seat cannot be used on mass produced vehicles because of the different dimensions of these individuals. To obtain a satisfactory result in this field without having to be content with mean dimensions and shapes determined by a computer, a seat has already been provided with multiple possibilities of adjustment and adaptation in which the passenger's bust is wedged laterally by means of upholstered wing members articulated to the back of the seat. As the control of the different parts of the seat necessitates a number of control and unlocking members adjustable seats of this kind have not been generally adopted.

The present invention, which obviates these drawbacks, relates to a seat whose seat and back cushions have adjustable lateral edges, a rapid adjustment device making possible simultaneous adjustment of the different parts of the seat to the body of the passenger.

The invention likewise relates to a device for locking and unlocking the different parts of the seating portion and back, permitting the use of articulates lateral edges with a large angular travel.

Such a seat comprising at least one seating portion and a back in several parts with lateral edges and parts adjustable against the force exerted by an elastic member round axes parallel to the edges of the seating portion and of the back is characterized in that each part of the seating portion and back is firmly connected to a sliding framework inserted between two locking plates, one fixed and one movable, the movable plate being controlled by a control device.

The invention will be better understood by means of the description which follows in connection with the attached drawings given by way of example and in which :

FIGS. 3 and 4 are views representing the control device.

FIG. 5 is a perspective view of plate 14.

Figure 1:
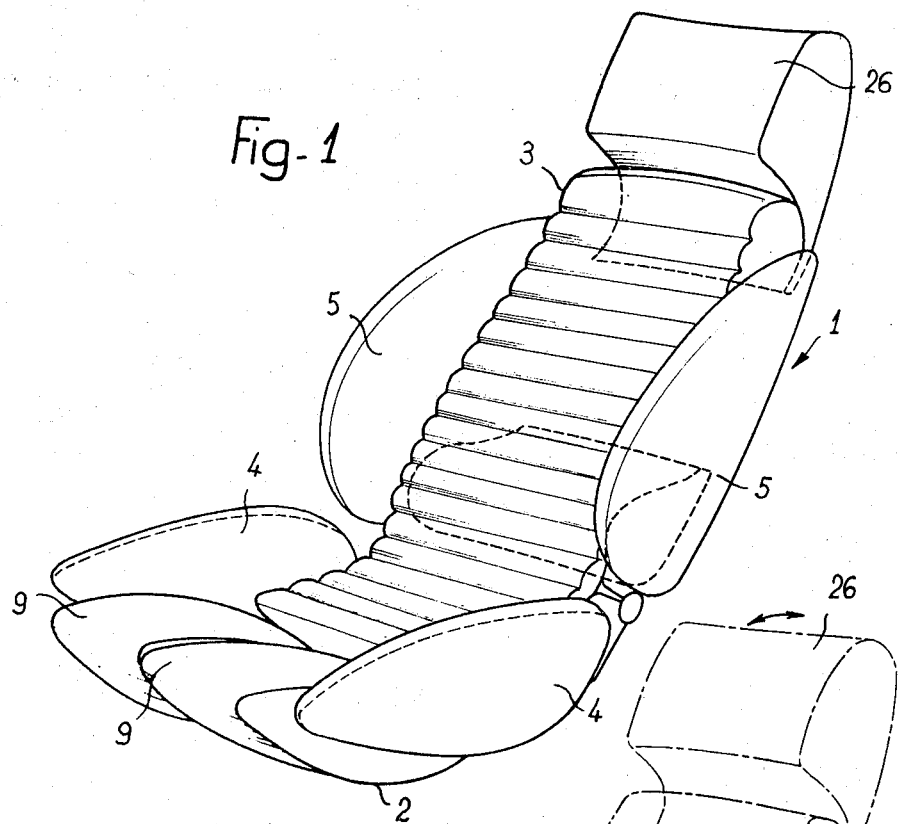
FIG. 1 is an exterior view of the seat.

The seat, designated as whole by 1 (FIG. 1) consists of one part forming a seating portion 2 receiving the seating cushion and a back part 3 carrying the back cushion.

Parts 2 and 3 have adjustable lateral edges 4 and 5 respectively.

Figure 2:
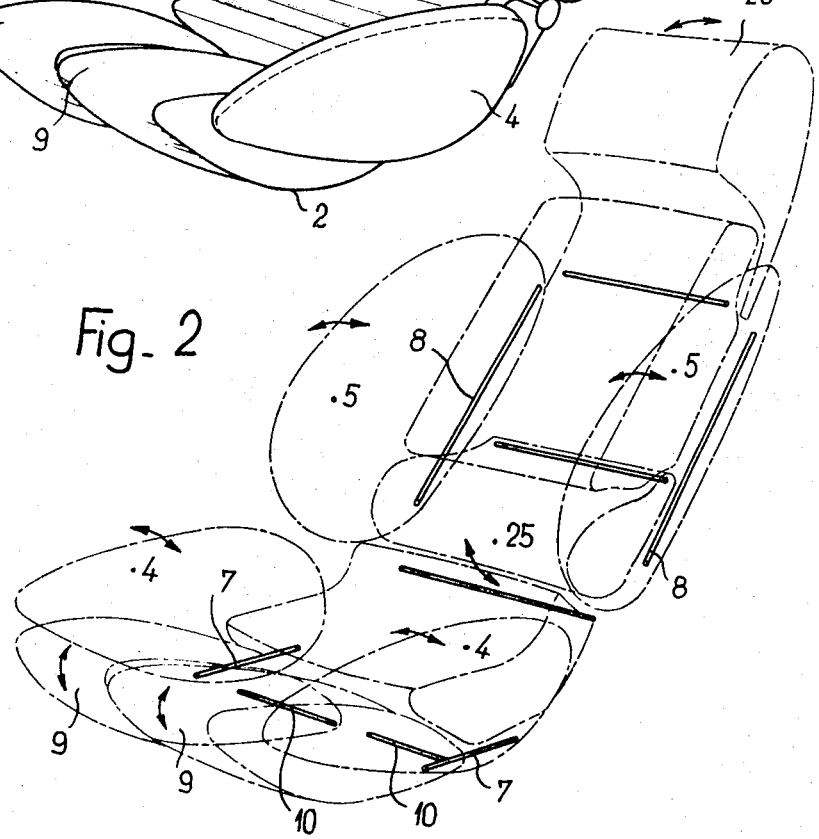
FIG. 2 is a diagrammatic view of the seat showing different axes of articulation.

These lateral edges 4 and 5 are adjustable against the force exerted by an elastic member or spring S shown in FIGS. 3 and 4 round axes or spindles 7 and 8 (FIG. 2). The elastic member may consist for instance of a torsion spring accomodated between the axes or spindles such as 7 and 8 and the tubular frame of the seat.

The advanced part of the cushion of the seat 2 has two supports 9 articulated round axes or spindles $10_1$.

The following part of the description refers only to the device for controlling the different parts forming the seating portion, but obviously everything concerning the said seating portion will be equally applicable to the back portion.

The invention is characterized in that the back portion 3, the lateral edges 4 and the supports 9 are firmly connected by means of connecting rods such as $9_1$ with sliding fittings 10, 11, 12 respectively which are free to move in guide slots 13 in a plate 14 (FIGS. 3 and 4 and perspective view in FIG. 5). The plate 14 is firmly connected to the framework of the seating portion by means of suitable fixing members such as bolts.

The fittings 10, 11 and 12 are inserted between two locking plates 15 and 16. The plate 15 is fixed to the frame 17 at the seat portion 17' while the plate 16 is displaceable by means of a control device comprising two levers 18, articulates on the one hand round two axes or spindles 19, 20 respectively located on the plate 16 and on the frame 17 of the seat and articulately interconnected by a spindle 21. The said spindle 21 is controlled for the purpose of locking or bolting the plates by a spring 22 and can be actuated for the purpose of unlocking them by an electric, electromagnetic or manual mechanism designated as a whole by 23.

Obviously the same locking and unlocking device can be fitted in the back portion for simultaneous control of a back-support 25, a head support 26 and lateral arm-rests 5 (FIG. 2).

Without going outside the scope of the invention it will of course be possible to synchronize electrically the control of the different parts of the seat respectively articulated to the back portion and the seating portion.

The seat thus constituted makes use of parts which are adjustable and separable (example : head support, seating squab and back support cushion, etc...). Assembly of these parts gives the seat an apparent continuity and conventional appearance.

Furthermore such a seat makes it possible to use advanced production techniques (foam in skin, foam forming skin) for producing the various separable parts of the seat.

We claim:

1. Seat comprising:
   a seat frame having a seating squab and a back-rest cushion each defining lateral edges,
   round axes parallel to the edges of the seating portion and the back portion,
   edge parts pivoting about said round axes and in engagement with elastic means which return said edge parts to an upright position,
   locking means comprising a fixed locking plate and a movable locking plate parallel to said fixed plate,
   connecting means attached to each of said edge parts and slidably inserted in said locking means between said fixed plate and said movable plate, and
   control means to move said movable plate to lock simultaneously the slidably inserted connecting means whereby all of the edge parts are locked into their adjusted pivoted position at the moment the locking means is locked.

2. Seat as claimed in claim 1, wherein said control means comprises:

two levers articulated around a common axis and having their opposite ends connected respectively to a parallel axis firmly connected to said movable locking plate and to a parallel axis firmly connected to said frame of said seat, first means to move said common axis in a direction to cause the opposite ends of said levers to approach each other and elastic means connected to said common axis to oppose the movement of said first means.

* * * * *